United States Patent
Yanay (10) Patent No.: US 8,152,673 B2
(45) Date of Patent: Apr. 10, 2012

(54) CONTINUOUSLY VARIABLE TRANSMISSION-BASED PLANETARY GEAR

(76) Inventor: Josef Yanay, Carmiel (IL)

(*) Notice: Subject to any disclaimer, the term of this patent is extended or adjusted under 35 U.S.C. 154(b) by 380 days.

(21) Appl. No.: 12/468,720

(22) Filed: May 19, 2009

(65) Prior Publication Data

US 2009/0227413 A1 Sep. 10, 2009

Related U.S. Application Data

(63) Continuation-in-part of application No. PCT/IL2007/001429, filed on Nov. 20, 2007.

(60) Provisional application No. 60/859,880, filed on Nov. 20, 2006.

(51) Int. Cl.
*F16H 47/08* (2006.01)

(52) U.S. Cl. .......................... 475/93; 475/91

(58) Field of Classification Search .............. 475/72, 475/91, 93, 94, 99, 100
See application file for complete search history.

(56) References Cited

U.S. PATENT DOCUMENTS

| | | | | |
|---|---|---|---|---|
| 3,240,083 A * | 3/1966 | Stoddard | | 475/94 |
| 3,852,998 A * | 12/1974 | Leeson | | 74/63 |
| 4,272,993 A * | 6/1981 | Kopich | | 475/90 |
| 5,073,160 A * | 12/1991 | Oshidari | | 475/281 |
| 5,512,021 A * | 4/1996 | Shash | | 475/1 |
| 5,967,934 A * | 10/1999 | Ishida et al. | | 475/269 |
| 6,135,909 A * | 10/2000 | Keiser | | 475/107 |
| 6,702,701 B2 * | 3/2004 | Phelan et al. | | 475/91 |
| 2006/0025905 A1 * | 2/2006 | Zhao et al. | | 701/22 |

* cited by examiner

*Primary Examiner* — Justin Holmes
(74) *Attorney, Agent, or Firm* — William H. Dippert; Eckert Seamans Cherin & Mellott, LLC (57) ABSTRACT

A continuous variable transmission is provided that is based on gearwheels. The novel gear acts as efficient transmission that can replace conventional manually or automatics gears. The CVT comprises sun gear connected to input shaft and ring gear fixedly connected to output shaft. Planet gear is arranged between and engaged with the sun gear and the ring gear wherein a planet carrier that is vertically enclosing the ring gear and the sun gear is provided with a canal in which an oil pump is provided. A control valve is capable of controlling the flow of lubricant within the canal.

25 Claims, 12 Drawing Sheets

CONTINUOUSLY VARIABLE TRANSMISSION-BASED PLANETARY GEAR

CROSS-REFERENCE TO RELATED APPLICATIONS

The present invention is a continuation-in-part of PCT Patent Application No. PCT/IL2007/001429, filed Nov. 20, 2007, and which claimed priority from U.S. Provisional Patent Application Ser. No. 60/859,880, filed Nov. 20, 2006, both of which are incorporated herein in their entirety.

FIELD OF THE INVENTION

The present invention relates to continuously variable transmission (CVT). More particularly, the present invention relates to a planetary gear for CVT.

BACKGROUND OF THE INVENTION

Continuous variable transmission (CVT) is a user and environmentally friendly automatic type transmission that can be used in different industries as well as in transportation. In vehicles, the control unit as a separated unit connected here which is responsible to the gear ratio changing, causing transmission automatically selects the gear ratio that is the exact ratio needed to the road speed in which the car is driven in. Basically, the purpose of CVT is to continuously vary the transmission ratio. The idea of CVT is known for years; however, to date, its implementation especially in vehicles had faced different problems.

Three types of CVT were developed; the friction CVT, which vary the radius of the contact point between two rotating objects and this is the tangential velocity; the hydrostatic CVT that vary the fluid flow with variable displacement pumps into hydrostatic motors; and ratcheting CVT that vary the stroke of the reciprocating motion that is connected to a free wheel resulting in an unidirectional rotation. Each mechanical system has its own inherent limitations.

At the early decades of the 20century, one concept of the continuous transmission was developed by H. van Doorne. Experimental version was built in a Lloyd LP400 in the fifty's and eventually the first cars were ordered and produced by the DAF company. Although the technology of CVT actually dates back decades, these types of transmissions did not penetrate the car industry and has until recently been limited mostly to smaller cars with transversely-mounted engines and front wheel drive. Only in the recent years, there are attempts to drive the CVT into the mainstream of the automobile industry.

Other transmissions were developed and another example is the CLAAS'CVT. Primary components of the HM transmission of CLAAS are a reverse unit, hydrostatic unit, double planetary gear and low and high speed coupler shafts, and a multistep reduction gear downstream of the coupler shaft. The power is split in the reverse unit into mechanical and hydro static paths.

Audi's engineers developed a multitronic CVT for years and now stating that the multitronic finally overcomes all the drawbacks of the stepless principles. This CVT is an improvement of the van doorne CVT type based on chain V-belt principle. A key element of the multitronic is a variator that adopts a new transmission element called a link-plate chain made entirely from steel and is almost as flexible as V-belt so to handle high forces and torque levels of the A6's engine. However, after few years of employing the multitronic in Audi cars, reports from customers show that after a certain amount of mileage, the multitronic is experiencing failure.

It appears that other CVT transmissions are also experiencing failure after a certain mileage. It is therefore a long felt need to develop a CVT that inherently have the potential benefits of the CVT transmission and can work for a long time without or with minimal failure.

There is a need for an efficient transmission that will be able to replace the conventional manually or automatics gears that are operated using steps in the gear ratio.

SUMMARY OF THE INVENTION

It is an object of the present invention to provide a CVT that is not friction based and is working on the base of gearwheels.

It is another object of the present invention to provide a gear for a CVT that is adapted to transmit force and torque without experiencing breakage.

It is yet another object of the present invention to provide a gear that acts as an efficient transmission and can replace the conventional manually or automatics gears.

It is provided in accordance with a preferred embodiment of the present invention a continuously variable transmission comprising:
- a sun gear connected to an input shaft;
- a ring gear fixedly connected to an output shaft;
- at least one mating pair planet gear arranged between and engaged with said sun gear and said ring gear;
- a planet carrier, adjacent to and vertically enclosing said ring gear and said sun gear through which said input shaft passes, is provided with a canal;
- at least one control valve adapted to control flow of lubricant within said canal; and
- at least one oil pump provided in said canal and engaged with said at least one planet gear that is capable of rotating together with said planet gear so as to allow flow of the lubricant within said canal.

It is further provided in accordance with another preferred embodiment of the present invention, one mating pair of planet gear is provided.

It is further provided in accordance with another preferred embodiment of the present invention, said at least one oil pump is a pair of mating gears.

It is further provided in accordance with another preferred embodiment of the present invention, a joined shaft is connecting one of said pair of planet gears to one of said pair of mating gears.

It is further provided in accordance with another preferred embodiment of the present invention, said canal is circular.

It is further provided in accordance with another preferred embodiment of the present invention, the number of control valves equals the number of oil pumps.

It is further provided in accordance with another preferred embodiment of the present invention, three control valves are associating with three oil pumps.

It is further provided in accordance with another preferred embodiment of the present invention, said at least one oil pumps comprises an outer rotor provided with peripheral ridges and an inner rotor provided with corresponding peripheral protrusions and wherein the rotation of the inner rotor and the outer rotor pushes oil that is disposed between them.

It is further provided in accordance with another preferred embodiment of the present invention, said input shaft is rotated by a power source.

It is further provided in accordance with another preferred embodiment of the present invention, said sun gear is provided with a bore that is in connection with said input shaft.

It is further provided in accordance with another preferred embodiment of the present invention, said at least one control valve is operated by means selected from a group of mechanical, electrical, hydraulic, or pneumatic mechanism, etc.

It is further provided in accordance with another preferred embodiment of the present invention, when said at least one control valve is fully closed and oil is not flowing in said canal, said sun gear, said planet gear, said ring gear and said oil pump are fixed together as a unit with said planet carrier causing the continuous variable transmission to rotate together so as to establish a transmission gear ratio of 1 to 1.

It is further provided in accordance with another preferred embodiment of the present invention, the continuous variable transmission is associated with a roller clutch.

It is further provided in accordance with another preferred embodiment of the present invention, the CVT is further associated with a slider provided with a movable wedge roller capable of associating with said planet carrier and stopping said planet carrier from rotation.

It is further provided in accordance with another preferred embodiment of the present invention, said wedge roller stops said planet carrier by friction.

It is further provided in accordance with another preferred embodiment of the present invention, said slider is a disc mounted onto a fixed axle wherein said disc is capable of moving in a limited angular movement between a first position and a second position onto said fixed axle and wherein in the first position said wedge roller is loose and in the second position said wedge roller is pressing a gear that associates with an external ring gearwheel and force said planet carrier to stop its rotation backward.

It is further provided in accordance with another preferred embodiment of the present invention, said axle is provided with a key projection and said disc is provided with a corresponding keyway that is limited within said key projection to allow said first position and said second position.

It is further provided in accordance with another preferred embodiment of the present invention, said wedge roller is provided within a recess between a gearwheel that is associated with said planet carrier and said fixed axle.

It is further provided in accordance with another preferred embodiment of the present invention, the CVT further connected to a hybrid engine that is capable of being charged through an external gearwheel that is connected onto the planet carrier.

It is further provided in accordance with another preferred embodiment of the present invention, the CVT further connected through gearing and clutch mechanism to an additional oil canal provided in a stationary stand and controlled by an additional control valve.

It is further provided in accordance with another preferred embodiment of the present invention, wherein said additional control valve is operable independently and parallel to said at least one control valve.

It is further provided in accordance with another preferred embodiment of the present invention, the CVT further provided with a stationary external canal that is split from said canal.

It is further provided in accordance with another preferred embodiment of the present invention, wherein said external canal is provided with a valve.

It is further provided in accordance with another preferred embodiment of the present invention, wherein said external canal is provided with a reservoir.

It is further provided in accordance with another preferred embodiment of the present invention, wherein said external canal is provided with a radiator that can be associated with the reservoir.

It is further provided in accordance with another preferred embodiment of the present invention, further comprising a lockup device capable of locking said at least one oil pump that is engaged with said at least one planet gear.

It is further provided in accordance with another preferred embodiment of the present invention, wherein said lockup device is activated in an on/off manner using a solenoid.

BRIEF DESCRIPTION OF THE DRAWINGS

In order to better understand the present invention and appreciate its practical applications, the following Figures are attached and referenced herein. Like components are denoted by like reference numerals.

It should be noted that the figures are given as examples and preferred embodiments only and in no way limit the scope of the present invention as defined in the appending Description and Claims.

DETAILED DESCRIPTION OF THE INVENTION

The present invention provides a novel and unique CVT that is rendered with numerous advantages relative to existing traditional transmissions. Among the advantages especially in vehicles there are the constant and stepless acceleration, the engine is working on optimal power range regardless the speed, better response to changes in road conditions, less power loss, and more. The mechanical version of the CVT deals with either frictional based CVT—the pulleys and V-belt CVT or the toroidal CVT that works by varying the radius of the contact point between two rotating objects. The mechanism of the CVT of the present invention does not involve friction, but is hydraulic; it uses pump or pumps to vary the hydraulic fluid flow. The hydraulic flange-planet carrier combined with planetary gearset to form a hybrid system.

The CVT of the present invention is advantageous in the fact that the gear ratio can change rapidly. This behavior is unachievable in the tools that are provided in the vehicle industry of today.

According to one aspect of a CVT of the present invention, the continuously variable transmission comprises a sun gear connected to an input shaft, a ring gear fixedly connected to an output shaft and at least one planet gear arranged between and engaged with the sun gear and the ring gear. A planet carrier that partially encloses and is positioned adjacent to the ring gear is provided with a canal in which lubricant is received. A control valve is adapted to control the flow of the lubricant within the canal in the planet carrier. Oil pump engaged with the planet gear and adapted to rotate together with the oil pump that is provided so as to push and compress alternately the flow of lubricant within the canal.

Figure 1:
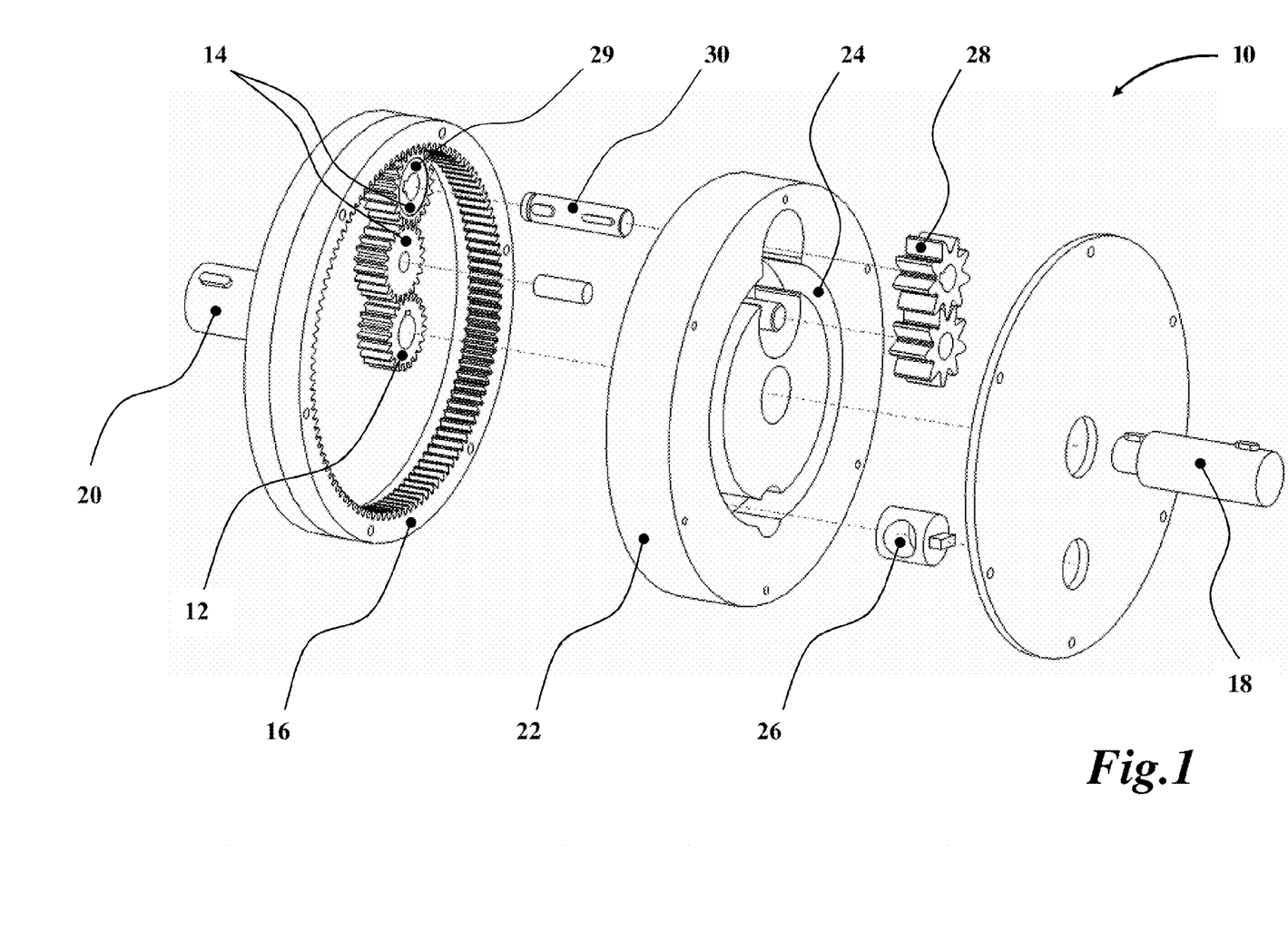
FIG. 1 illustrates an exploded view of continuously variable transmission apparatus gears in accordance with a preferred embodiment of the present invention.

Reference is now made to FIG. 1 illustrating an exploded view of continuously variable transmission apparatus in accordance with a preferred embodiment of the present invention. Continuously variable transmission 10 comprises a sun gear 12, planet gear 14 preferably comprised of a pair of gears, and a ring gear 16. Basically, input shaft 18 is connected to sun gear 12 through a floating bore in the planet carrier and oil canal cover and an output shaft 20 is fixedly connected to ring gear 16. Input shaft 18 that is adapted to rotate due to power source such as an engine to which it may be connected, forces sun gear 12 to rotate. Sun gear 12 is coupled with planet gears 14 that rotate as well as a consequence of the sun gear rotation. The planet gears are coupled also with ring gear 16 that in turn rotates output shaft 20, which is fixedly connected to the ring gear.

It should be noticed that the planet gears can be made of gearwheels having different diameters without limiting the scope of the present invention.

The gears are adjacent to a planet carrier 22 that is enclosing the ring gear by its diameter and enclosing the sun gear and the planet gear, which is disposed between the sun gear and the ring gear. The input shaft passes through a hole substantially in the middle of planet carrier 22. Planet carrier 22 is provided with substantially circular oil canal 24 adapted to receive a lubricant and allowing a lubricant to flow within the canal. The flow of the lubricant within oil canal 24 is controlled by a control valve 26 while an oil pump 28 is provided within the canal. The control valve can be operated in several optional manners such as mechanically, electrically, hydraulically, pneumatically or any other way without limiting the scope of the present invention.

One of the pair of the planet gear acts as an oil pump drive gear 29 that is provided with a joined shaft 30 that is engaged also with oil pump 28. When planet gear 14 is rotating, oil pump drive gear 29 constantly rotates oil pump 28 causing the lubricant within the canal to flow.

It should be mentioned that the oil pump and the planet gear can be associated in a direct and indirect manner. In the direct manner, a joint shaft can be used as shown herein; however, any other indirect association can be used.

Figure 2:
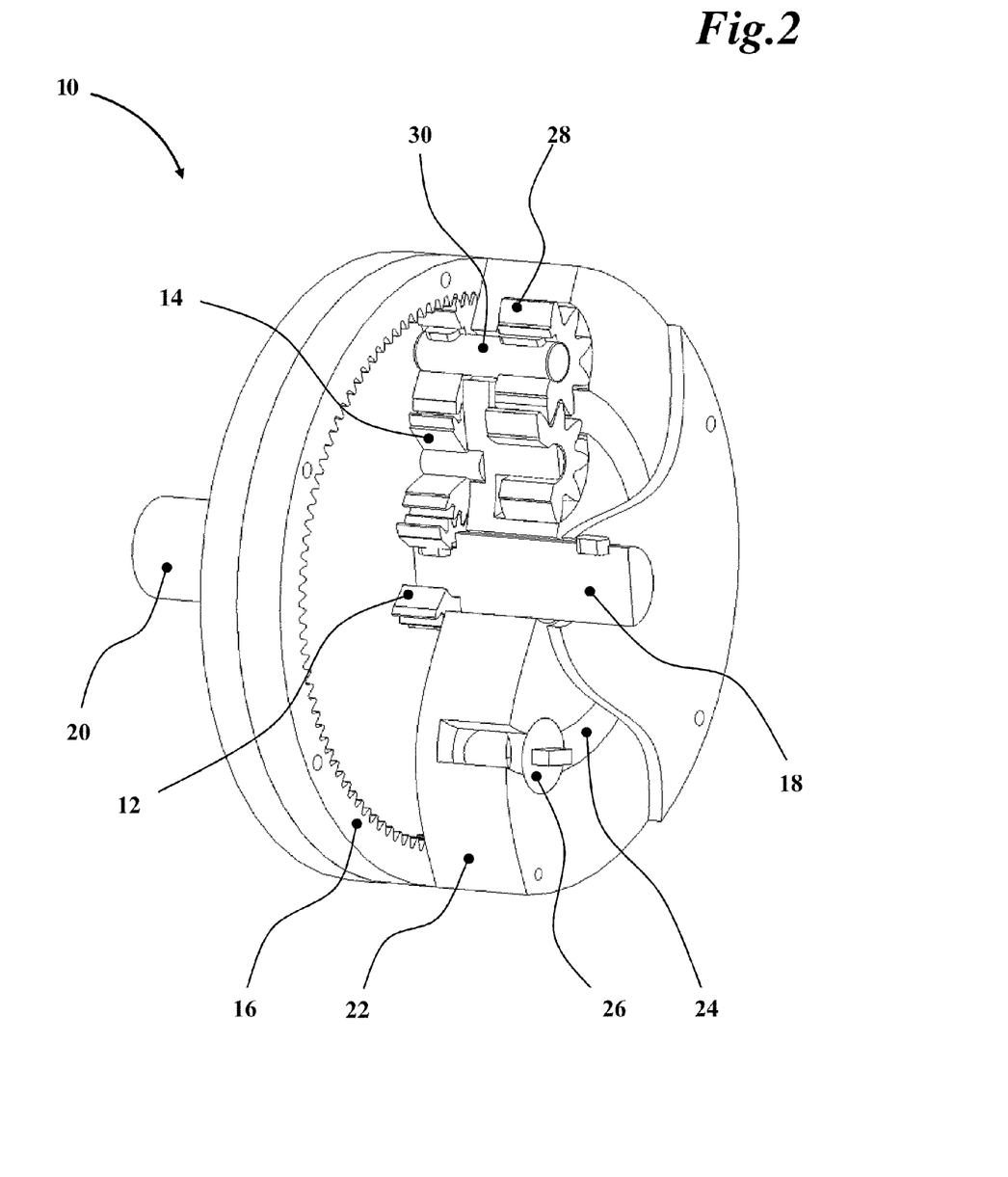
FIG. 2 illustrates a partial cross sectional view of continuously variable transmission in accordance with a preferred embodiment of the present invention.

Reference is now made to FIG. 2 illustrating a partial cross sectional view of continuously variable transmission in accordance with a preferred embodiment of the present invention. Sun gear 12 is shown to substantially be positioned in the same plane as ring gear 16 and planet carrier 22 is shown to enclose CVT 10. Shaft 30 is clearly shown to be in engagement relationship with oil pump drive gear 29, which is one of pair of planet gear 14 and rotates with it, as well as with oil pump 28.

Figure 3:
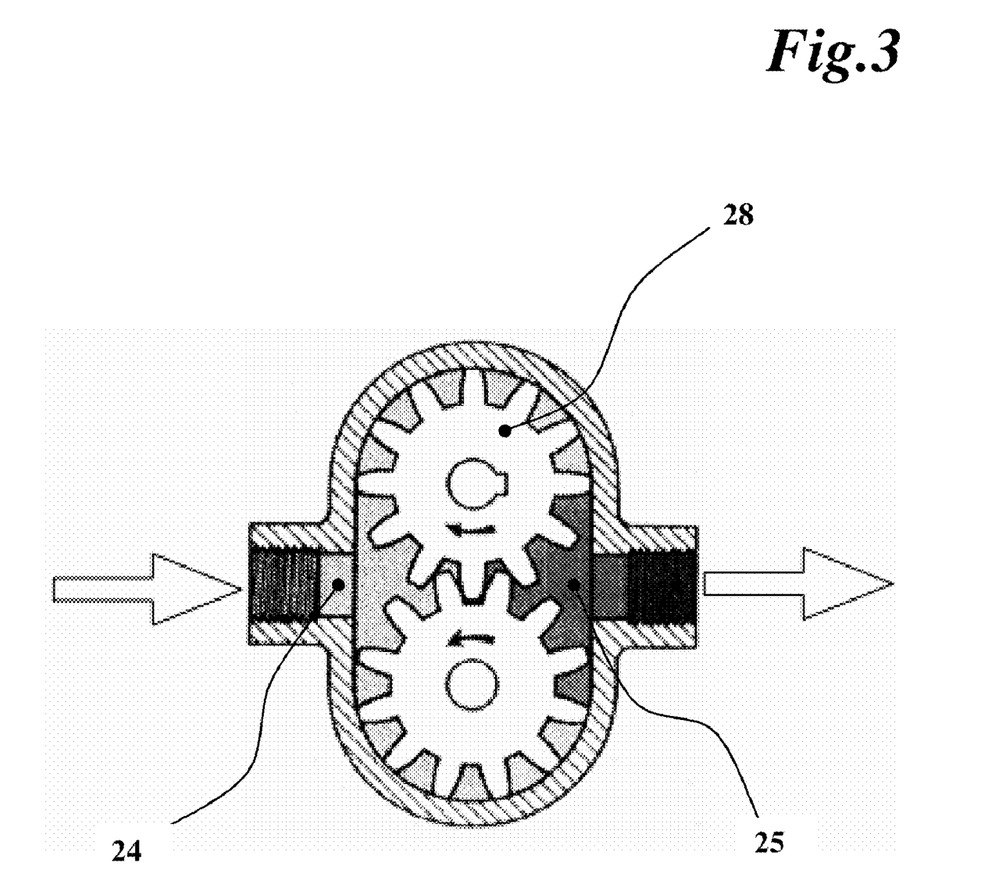
FIG. 3 schematically illustrates an oil pump that is used within the oil canal shown in FIG. 1.

Reference is now made to FIG. 3 schematically illustrating an oil pump that is used within the oil canal shown in FIG. 1. Oil pump 28 comprises two mating gears wherein one of the pair is engaged through a shaft to a planet gear as shown and explained herein before.

Optionally, the mating gears of the oil pump are engaged through a shaft by gearwheel or gearwheels set to the oil pump in order to drive gear 28.

Optionally, other driving means can be employed to drive the oil pump without limiting the scope of the present invention.

Oil pump 28 is provided within oil canal 24 in which lubricant 25 is received. The rotation of both gears 28 causes lubricant 25 to flow within oil canal 24 in the direction shown by the arrows. However, it should be emphasized that more than a pair of mating gears can be used and moreover, other types of rotational oil pumps that are available in the art or are novel can be also used in the embodiment of the present invention without limiting the scope of the present invention. An optional oil pump is depicted in FIG. 5.

Figure 5:
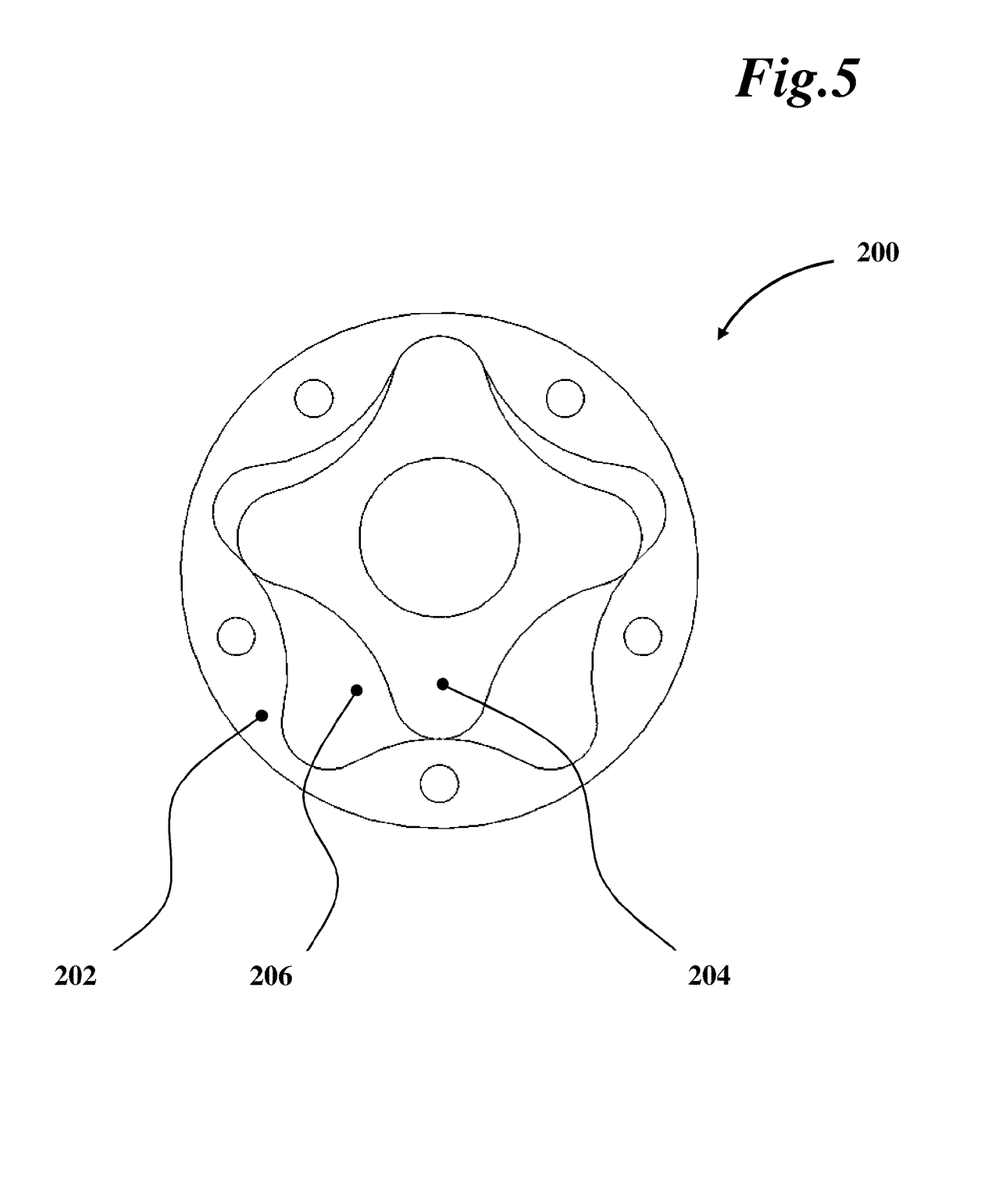
FIG. 5 illustrates an oil pump that can be utilized in a CVT in accordance with another preferred embodiment of the present invention.

Reference is now made to FIG. 5 illustrating an oil pump that can be utilized in a CVT in accordance with another preferred embodiment of the present invention. Oil pump 200 comprises an outer rotor 202 and an inner rotor 204. Peripheral ridges are provided in outer rotor 202 that correspond to peripheral protrusions of inner rotor 204. The rotation of the two elements pushes oil that is disposed between them 206. The drive shaft of the planet gear drives the oil pump in the CVT. The concept of the CVT is maintained unchanged.

Returning to FIG. 2 illustrating the CVT. The lubricant (not shown in this Figure) is constantly flowing within oil canal 24 as long as control valve 26 is in an open state. When control valve 26 is fully open, planet carrier 22 rotates backwardly, however is provided with a mechanism that does not allow it to rotate as will be shown herein after and ring gear 16 rotates while rotating output shaft 20. The transmission ratio in this state equals the number of teeth of sun gear 12 divided by the number of teeth in ring gear 16. In the example shown herein in FIG. 1, the transmission ratio equals 21/108 which is 0.194- about 1 to that correspond to first gearing position of a car, which is much more powered, and therefore, each 5 rotations of the car engine, which rotates input shaft 18, transmit 1 rotation to output shaft 20, which is rotating the car's wheels.

In the other extreme situation, control valve 26 is fully closed and it cause all gears in the apparatus to be locked together, the gears of the oil pump as well as the sun, planet and ring gears. The planet carrier rotates as one unit with ring gear 16 and therefore, the transmission ratio is 1 to 1—for each rotation of the input shaft, the output shaft is rotating once in an equivalent manner.

The transmission ratio is changed from the first extreme state to the second extreme state in a continuous manner that depends of the condition of the control valve and eventually, the gear ratio is determined by the condition of control valve 26 between those two extreme states.

The oil canal in the planet carrier can be provided with several oil pumps. The actuation of each one of the oil pumps is the same as explained herein before.

In case heavier machinery is to be used and in another aspect of the present invention, more than one oil pumps is needed to be used within the canal in the planet carrier.

Figure 4:
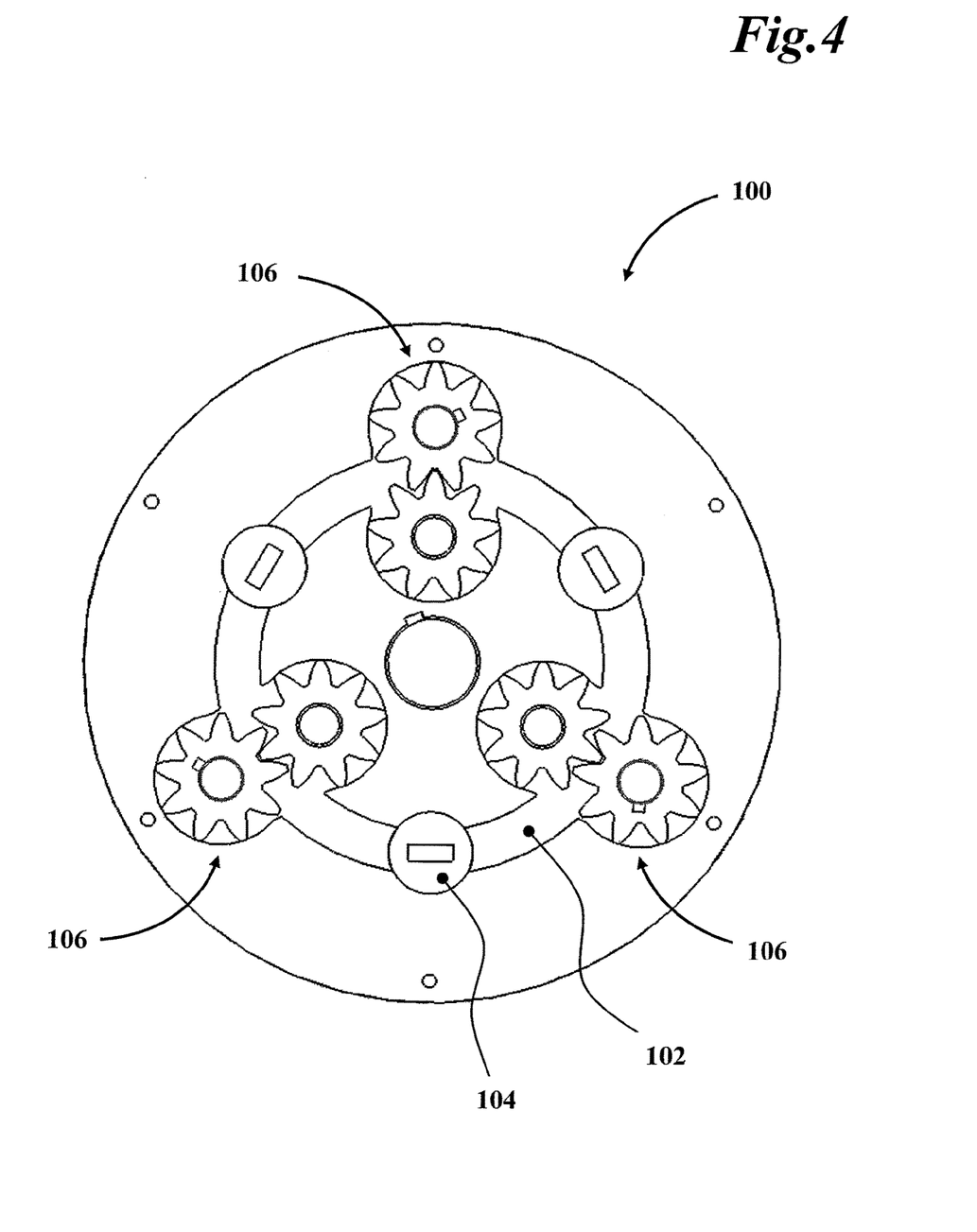
FIG. 4 illustrates a cross sectional view of a planet carrier in accordance with another preferred embodiment of the present invention, provided with three oil pumps.

Reference is now made to FIG. 4 illustrating a internal view of a planet carrier in accordance with another preferred embodiment of the present invention, provided with three oil pumps. Planet carrier 100 is provided with an oil canal 102 provided with three control valves 104 adapted to control the flow of oil within the canal. Oil canal 102 is provided with three oil pumps 106, each oil pump is provided with a pair of mating gears as previously explained. As mentioned herein before, this embodiment is intended to be used in cases there is a massive load, as an example, for actuating heavy machinery and big vehicles. The use of three oil pumps is beneficial since it deploys the oil pressure forces that are employed on the pumps in equal manner in order to reduce the force each pump tolerates.

In each one of pumps 106, one gearwheel of the pair is actuated by the planet gear that is provided within the CVT enclosure as explained herein before in the case of the single pair and single oil pump.

In order to understand the concept of increasing the number of oil pumps, let's assume the planed CVT has to transmit a moment of 15 Kg/m. In case one oil pump is used (as shown in FIG. 1-2), the force will be concentrated on this single pump. In order to avoid breakdown of the CVT, three possible solutions can be employed; the first is to increase the diameter of the oil pump, the second is to increase the width of the teeth and the third and the beneficiary possibility is to increase the number of the oil pumps while there is a possibility to decrease their diameter in the example of using three pumps.

It should be noted that the number of oil pumps is dependant on the diameter of the planet carrier.

It should be noted that the actuating gearwheel of the pair can be any one of the pair, the inner gearwheel or the outer gearwheel, wherein in the shown case, the driving gearwheel is the outer gearwheel of the pair.

It should be emphasized that the number of oil pumps has to be equal to the number of control valves in order to keep the oil pumps in a position to avoid breakdown due to significant moment such as 15 Kg/m. It should be also emphasized that the timing of closing or opening the control valves as well as their position has to be carefully planned to be adjusted to one another. Otherwise, one of the oil pumps can bear in a certain timing higher moments and experience a failure.

Figure 6A:
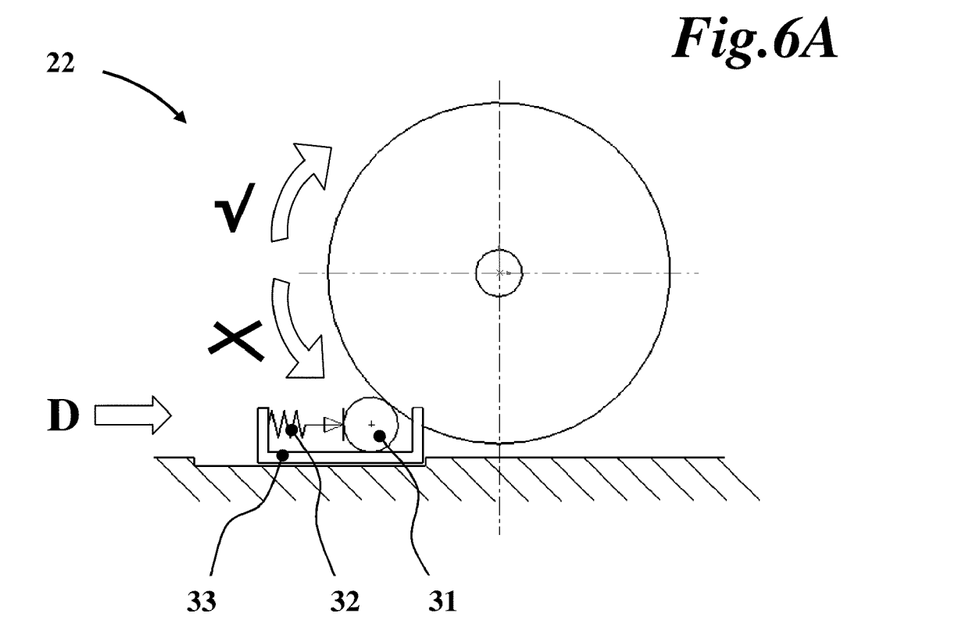
FIGS. 6A, B schematically illustrate a roller clutch working on the principle of a CVT in accordance with a preferred embodiment of the present invention, in driving and floating situations, respectively.
Figure 6B:
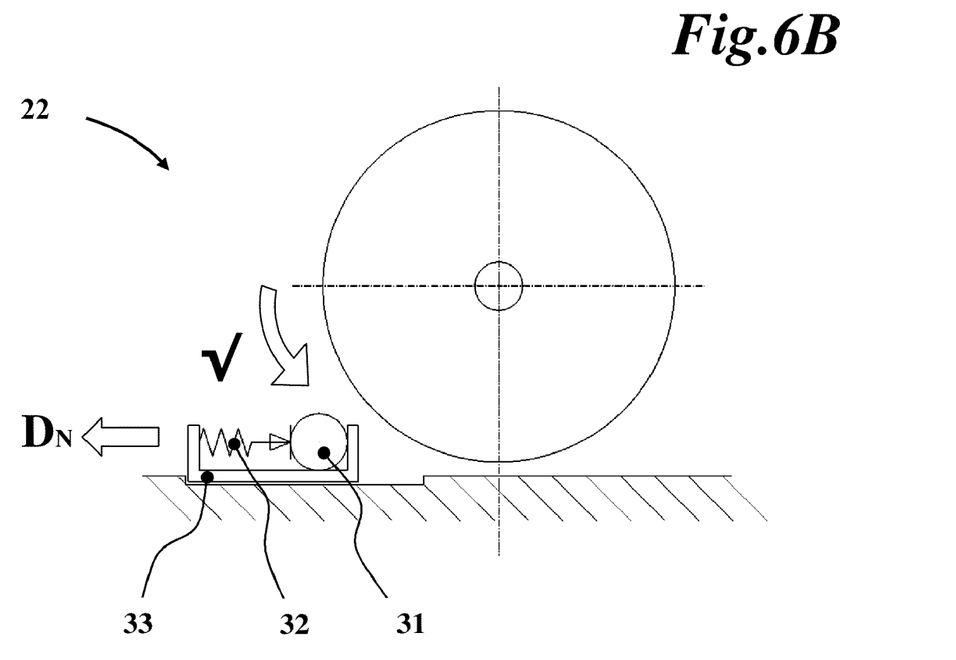

Reference is now made to FIGS. 6A and 6B schematically illustrating a roller clutch working on the principle of a CVT in accordance with a preferred embodiment of the present invention, in driving and floating situations, respectively. First, when the neutral [N] position is presented, full separation between the wheels and the rotating shaft that is rotated by the engine occurs in the transmission of the present invention. Two situations of the CVT are shown in FIG. 6 wherein planet carrier 22 is shown to be associating with a roller clutch or a wedge roller 31 that is placed in a slider 33 that is capable of moving forward towards planet carrier 22 (6A) and away from it (6B). Roller wedge 31 is resiliently connected to slider 33 by spring 32 that pushes roller wedge 31 as a default. When it slides to planet carrier 22, the situation that is shown in FIG. 6A is present and slider 33 is forwarded toward planet carrier 22 and roller 31 acts as a wedge that stops the planet carrier from rotating anticlockwise. When the car's drive handle is positioned on drive [D], the planet carrier 22 can be rotated clockwise as shown by the arrow indicated by ☑sign that indicate the possibility of the carrier to rotate; however, roller wedge 31 is in such association with planet carrier 22 that the carrier is unable to rotate only when the car is in start moving situation. Shaft 20 (in FIG. 1) is connected to the car's wheels with no dependency on whether the control valves are open or closed as mentioned herein before but the position of the control valves of the oil canal determines the gear ratio. When the oil canal is fully open, the transmission is in the first gear state, and when as the closure of the oil canal is approached, the transmission is transformed into higher gears state.

When the wheels are stopped due to the driver, roller wedge 31 is moved backwardly by slider 33, Spring 32 is now released and roller 31 isn't touching planet carrier 22—the situation that is shown in FIG. 6B is presented—is near to neutral state. In this state, planet carrier 22 is continuously rotating in an anticlockwise direction (the arrow indicated by the sign ☑. As mentioned herein before, in spite the neutral situation, the engine is associating with the transmission and the transmission is rotating also in this situation, therefore, this situation is indicated by [DN].

Figure 7A:
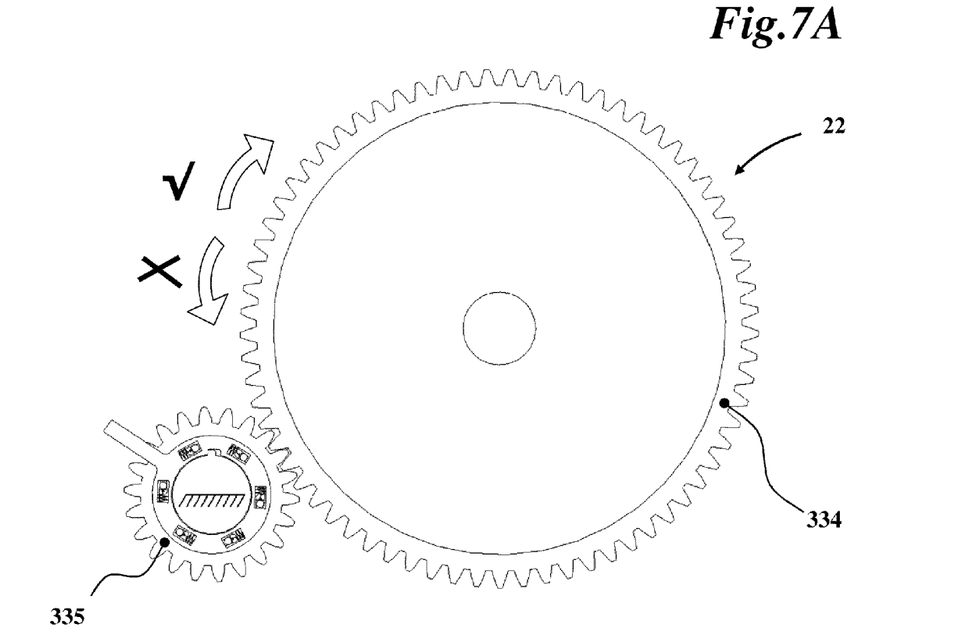
FIGS. 7A, B illustrate a roller clutch working on the principle schematically shown in FIG. 6.
Figure 7A:
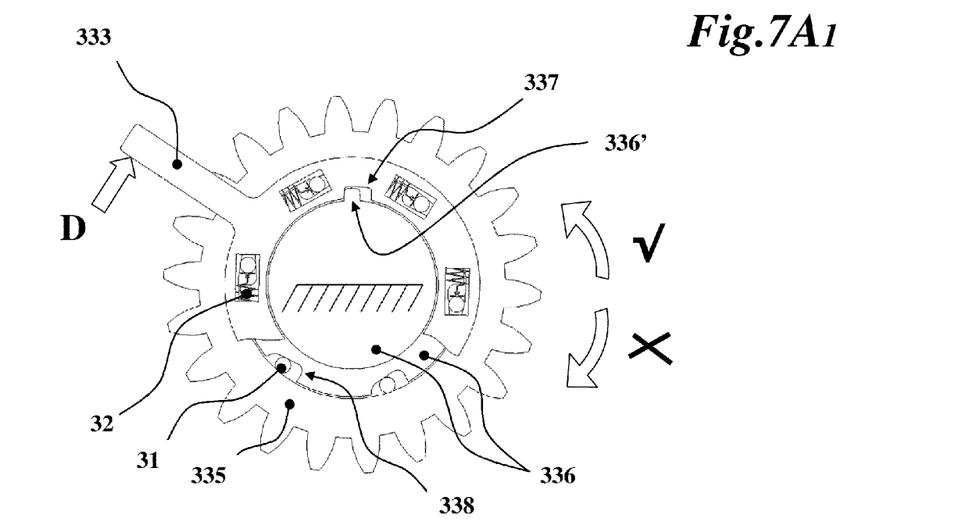
Figure 7B:
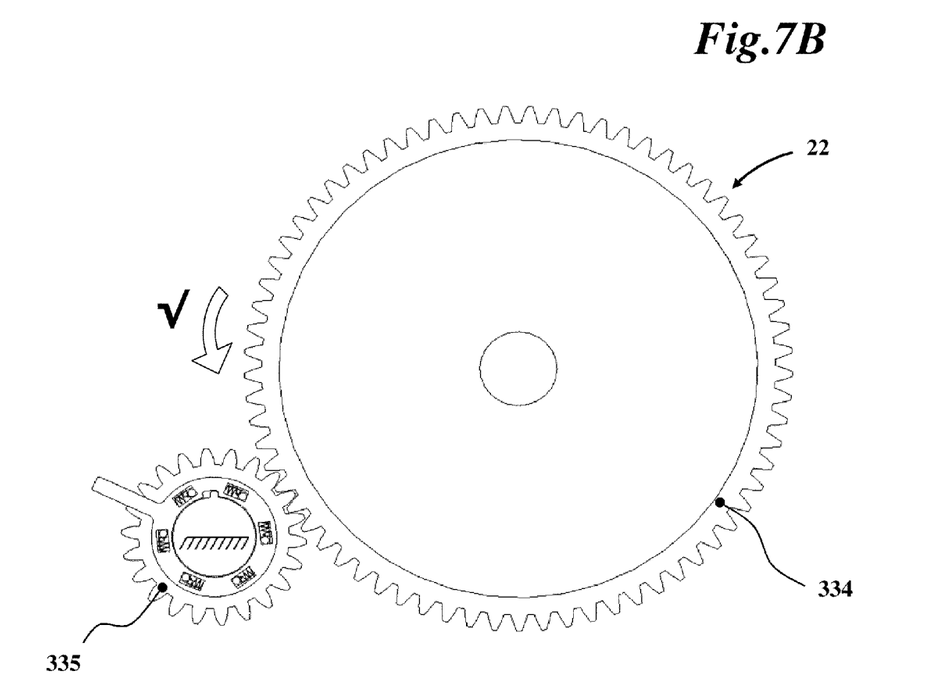
Figure 7B:
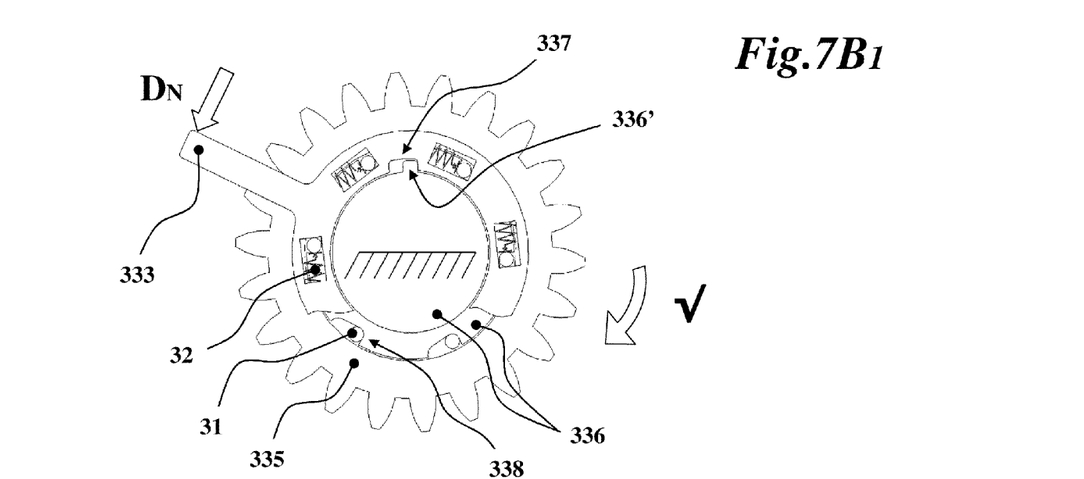

Reference is now made to FIGS. 7A and 7B illustrating a roller clutch working on the principle schematically shown in FIGS. 6A and 6B. FIGS. 7A1 and 7B1 are enlargements of a part of FIGS. 7A and 7B, respectively so as to distinguish between the different elements. Axle 336 is a fixed axle onto which a gearwheel 335 is rotating. Disc 333 (schematically illustrated as the slider in FIG. 6) is mounted on axle 336. The movement of disk 333 on axle 336 is limited by a keyway 337 and a corresponding key projection 336' that is provided in the axle. For a Drive state [D], disc 333 is moved in clockwise direction as shown in FIG. 7A1 and is moved anticlockwise to the position shown in FIG. 7B1 in order to establish the state explained herein before DN—the floating state. The slider or disc 333 movements between the states is controlled using a control unit wherein by default, disc 333 is positioned in Drive state when gear handle positioned in [D] state that is shown in FIG. 7A1. When the control unit is receiving an indication that the car is reducing speed close to zero speed, the control unit will force to move the disc 333 to move anticlockwise to the Neutral floating state as shown in FIG. 7B1. Gearwheel 335 in any case is associated with an external gearwheel 334 mounted on planet carrier 22 so as to control the movements of the CVT that is enclosed within.

The state of roller 31 and spring 32 in slider 33 that is shown in FIG. 6 and disc 333 are also shown in the application in FIGS. 7A and 7B. In FIG. 7B1, wedge rollers 31 are shown to be in a loose state within recess 338 so as to enable gearwheel 335 to move without limitation. In FIG. 7A1, wedge roller 31 is stressed within recess 338 so as to press onto gearwheel 335 and preventing its movement clockwise. As a consequence, planet carrier 22 is not rotating anticlockwise.

Figure 8:
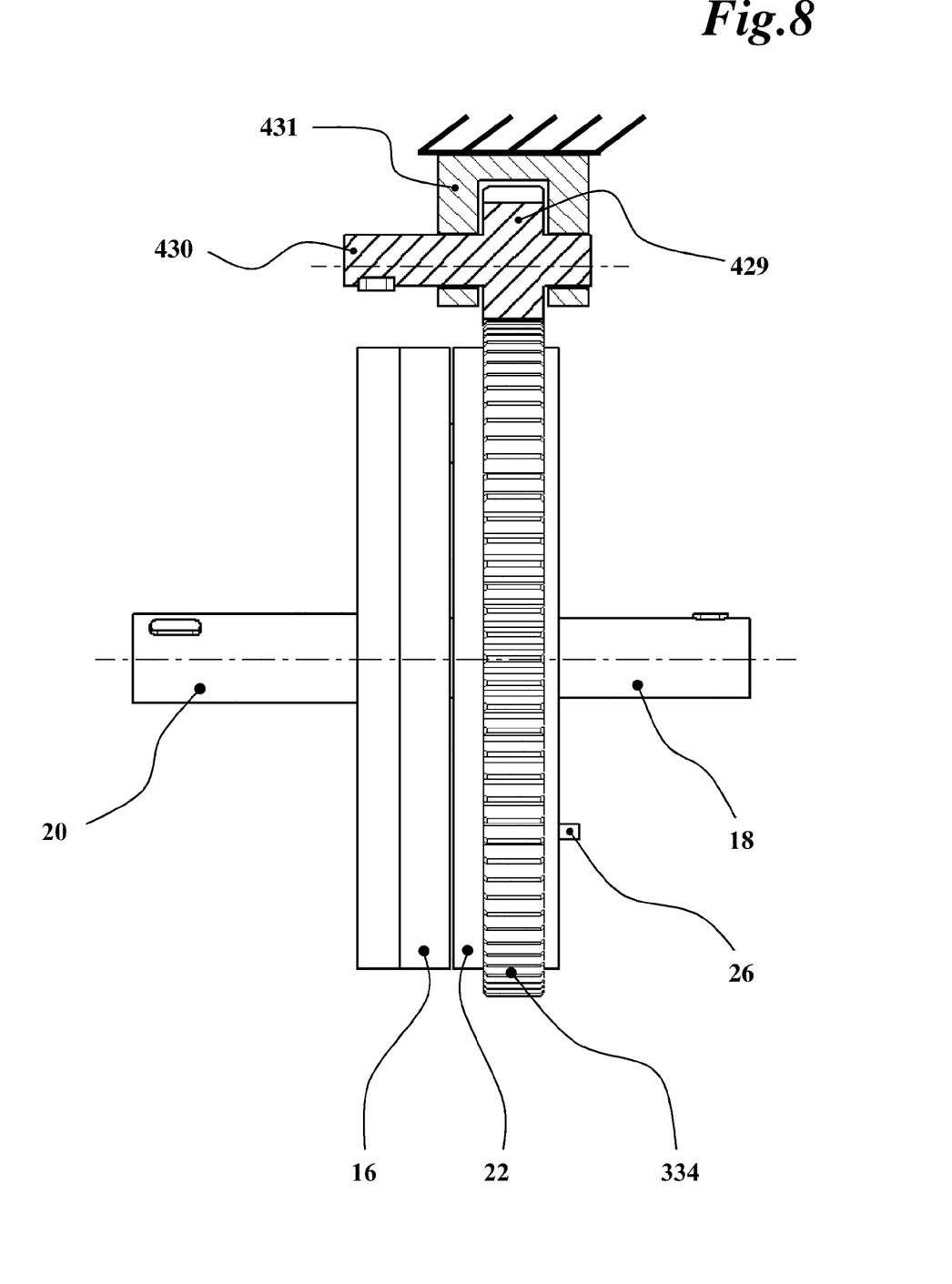
FIG. 8 illustrates continuously variable transmission apparatus to be incorporated within a hybrid car in accordance with a preferred embodiment of the present invention.

Reference is now made to FIG. 8 illustrating continuously variable transmission apparatus to be incorporated within a hybrid car in accordance with a preferred embodiment of the present invention. The CVT of the present invention can be incorporated within a hybrid vehicle while due to its unique features it can be utilized for producing electricity when the vehicle is braking. External gearwheel 334, which is provided to a CVT apparatus such as the ones shown herein above, is associated with a driving gearwheel 429 that in turn rotates an axis 430. Driving gearwheel 429 and axis 430 seat in a stationary stand 431. Axis 430 is an output shaft that rotates the rotor of the electric engine. This application of the CVT mechanism is activated when the vehicle is braking, no matter the condition of the road. When the vehicle is in Drive mode, axis 430 rotates in a Neutral state. When the vehicle is in Brake state, the electrical generator of the hybrid vehicle is operated so as to charge the battery. The rotation of the CVT apparatus rotates external gearwheel 334 that rotates driving gearwheel 429 and in turn, rotates axis 430 to charge the electric engine.

Figure 9:
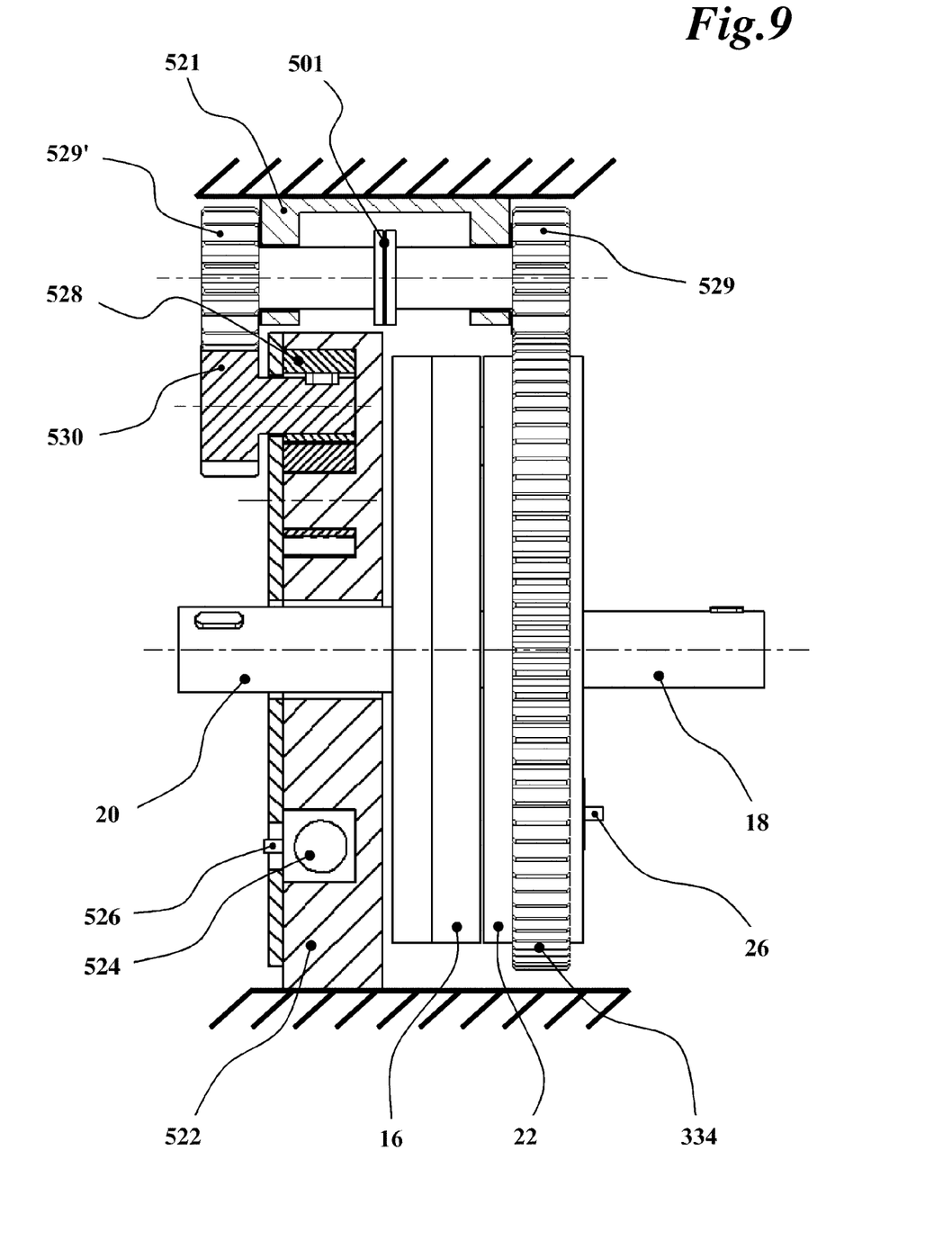
FIG. 9 illustrates continuously variable transmission apparatus to be incorporated within a heavy duty vehicle in accordance with a preferred embodiment of the present invention.

Reference is now made to FIG. 9 illustrating continuously variable transmission apparatus to be incorporated within a heavy duty vehicle in accordance with a preferred embodiment of the present invention. External gearwheel 334 is associated with a driving gearwheel 529 that in turn can rotate the heavy duty braking system, between stand 521 and stand device 522. Heavy duty system comprises a clutch 501 that is connected from one side to driving gearwheel 529 and driven gearwheel 529'. Driven gearwheel 529' is associated with a driven gearwheel 530 associated with oil pump 528 provided within a oil canal 524. Oil canal 524 is controlled by control valve 526 that is similar to control valve 26 of the CVT system that is shown in the FIG. 1 as well as herein above in details. When the driver starts to brake and releases the gas paddle, a control unit (not shown in the figures) operates clutch 501 and closes gradually control valve 526. The closure of control valve 526 depends on the desired braking force; the valve closes as the required force of braking is increased. When control valve 526 is fully closed, oil pump 528 stops from rotation that in turn stops part 22 from rotating. This action will lead to the highest possible transmission ratio, meaning the first gear.

Figure 10:
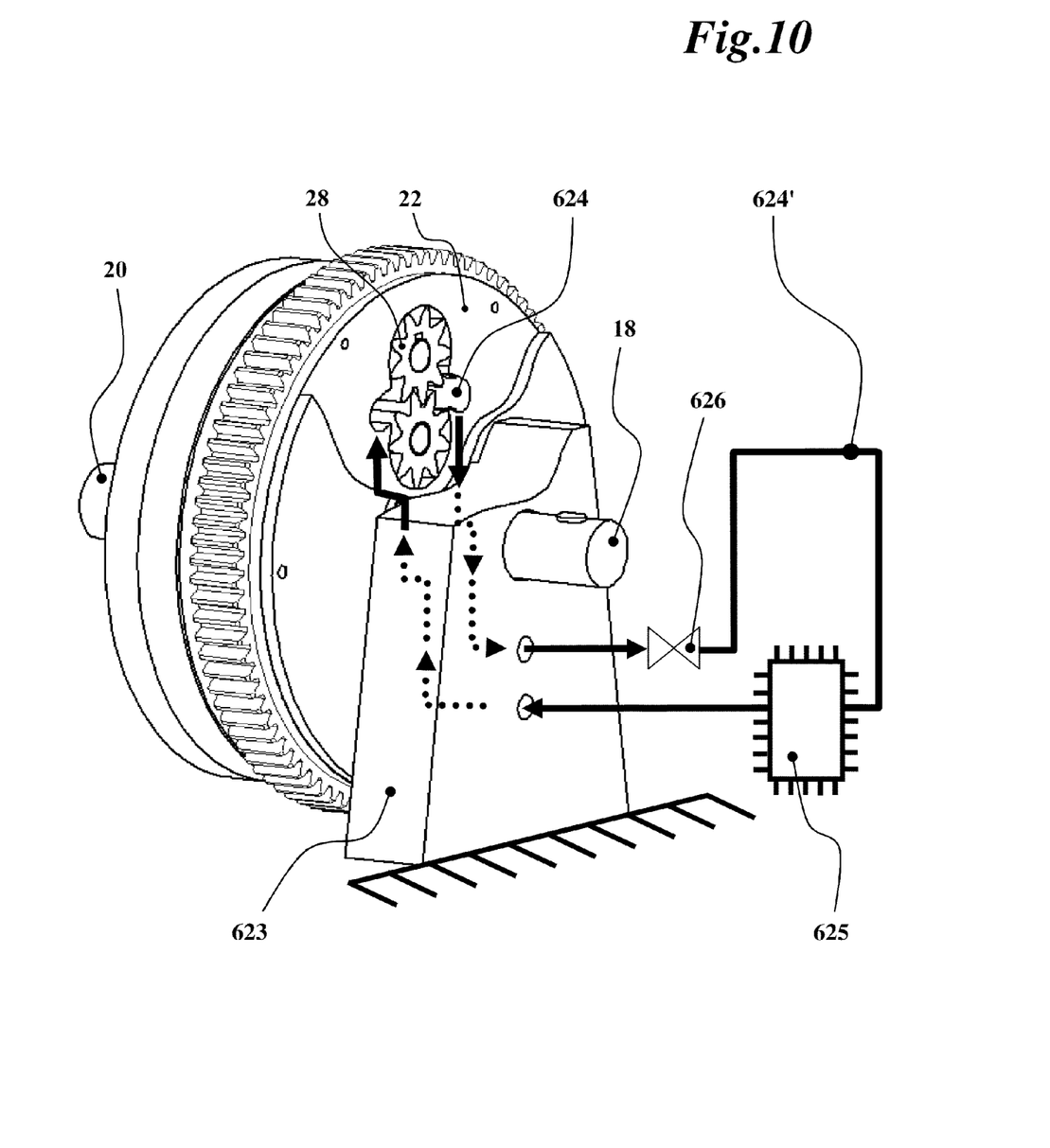
FIG. 10 illustrates continuously variable transmission apparatus to be incorporated within a heavy duty vehicle in accordance with another preferred embodiment of the present invention.

Reference is now made to FIG. 10 illustrating continuously variable transmission apparatus to be incorporated within a heavy duty vehicle in accordance with another preferred embodiment of the present invention. This embodiment illustrates a solution to possible heat problems that may occur in the oil canal due to generation of heat. In this case, the oil canal that is provided within the planet carrier is split and leading to external loop 624' from canal 624 that is provided within planet carrier 22. The external loop is schematically illustrated and is passed through a stationary stand 623. External loop 624' exits oil line connected through stationary stand 623 and returns to the split canal 624 in the planet carrier. In the way, it passes a valve 626 and an oil reservoir 625. The oil reservoir also functions as a radiator, in order to cool the oil through a plurality of fins.

It should be noted that the planet carrier can be provided with a plurality of pumps that are able to convey the oil from the planet carrier 22 through the stationary stand 623 to oil line 624'.

Figure 11:
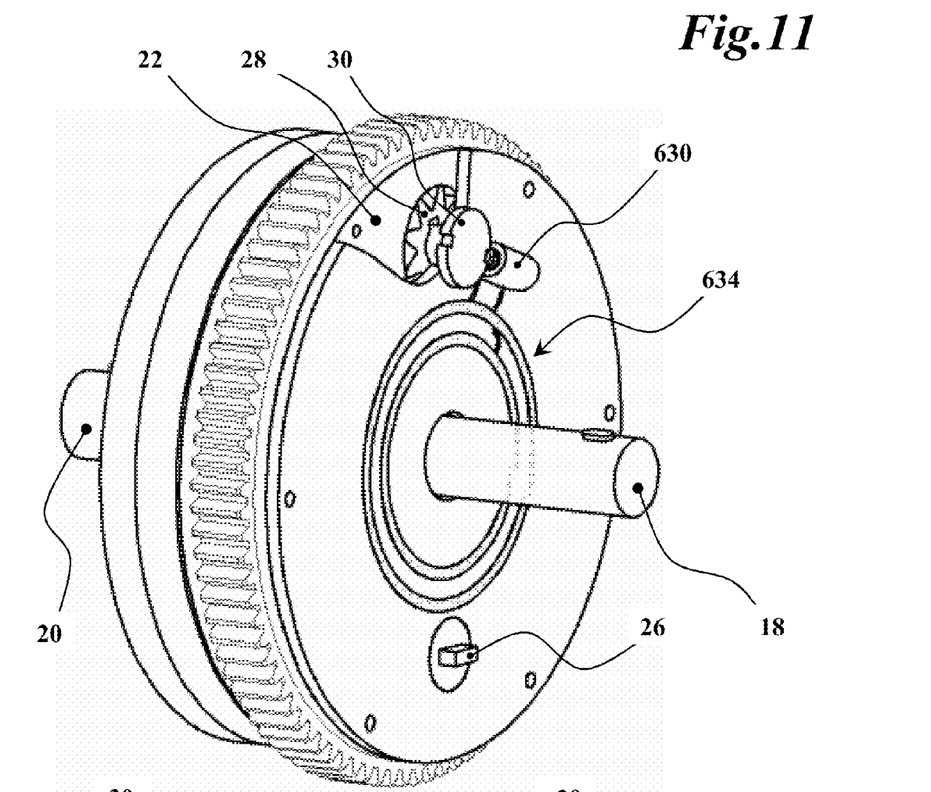
FIG. 11 illustrates a continuously variable transmission apparatus in accordance with yet another preferred embodiment of the present invention.

Reference is now made to FIG. 11 illustrating a continuously variable transmission apparatus in accordance with yet another preferred embodiment of the present invention. A lockup device 630 is capable of being operable in gear ratio 1:1 so as to prevent slippage or oil drifting in the oil pump in order to maintain the efficiency of the CVT. Lockup device 630 locks up joined shaft 30 so that the oil pump and the flange connected hear are operated as an integral part.

Figure 11A:
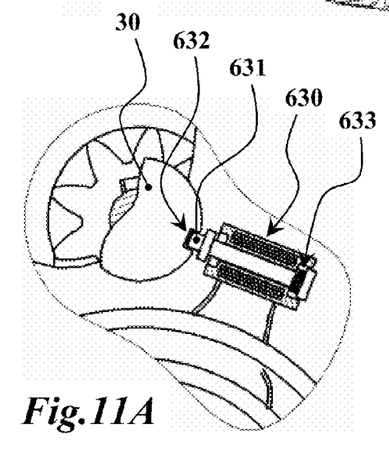
FIGS. 11A, B illustrate enlargement of areas in FIG. 11 wherein the lockup device is shown in two states.
Figure 11B:
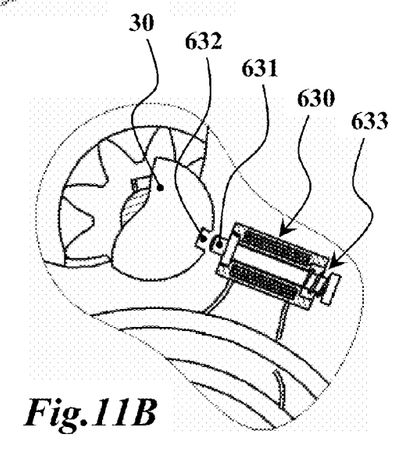

Reference is now made to FIGS. 11A and 11B illustrating enlargement of areas in FIG. 11 wherein the lockup device is shown in two states. Details of an optional lockup device are shown to be comprised of a solenoid 630 having a pin 631 capable of being inserted into a corresponding recess 632 that locks shaft 30. A spring 633 is provided to solenoid 630 for a backward movement so as to unlock the connection between the solenoid and the shaft when the current to the solenoid is stopped. Voltage is provided to solenoid 630 through slip rings 634. In FIG. 11A, shaft 30 is shown to be locked with solenoid 630 and in FIG. 11B, the shaft is free. Solenoid 630 takes over in gear ratio 1:1 if there is a leak of oil in order to lockup shaft 30.

It should be mentioned that any other lockup mechanism can be used in order to be served as leakage prevention mechanism. Shaft 30 can be locked using other shafts placed in the planetary gear layer, that are already in the device or from an adjunct system.

It should be clear that the description of the embodiments and attached Figures set forth in this specification serves only for a better understanding of the invention, without limiting its scope as covered by the following Claims.

It should be also clear that a person skilled in the art, after reading the present specification can make adjustments or amendments to the attached Figures and above described embodiments that would still be covered by the following Claims.

What is claimed:

1. A continuously variable transmission comprising:
    a sun gear connected to an input shaft;
    a ring gear fixedly connected to an output shaft;
    at least one mating pair of planet gears arranged between and engaged with said sun gear and said ring gear;
    a planet carrier adjacent to and vertically enclosing said ring gear and said sun gear through which said input shaft passes, is provided with a substantially circular closed canal;
    at least one control valve capable of controlling flow of lubricant within said canal; and
    at least one oil pump provided in said canal, said at least one oil pump driven by and engaged with one gear of the planet gear mating pair and capable of rotating together with the planet gear so as to allow flow of the lubricant within said canal.

2. The continuously variable transmission as claimed in claim 1, wherein said at least one oil pump comprises a pair of mating gears.

3. The continuously variable transmission as claimed in claim 2, wherein a joined shaft is connecting one gear of said at least one mating pair of planet gears to one of said pair of mating gears.

4. The continuous variable transmission as claimed in claim 1, wherein the number of control valves equals the number of oil pumps.

5. The continuously variable transmission as claimed in claim 1, wherein three control valves are associating with three oil pumps.

6. The continuously variable transmission as claimed in claim 1, wherein said at least one oil pumps comprises an outer rotor provided with peripheral ridges and an inner rotor provided with corresponding peripheral protrusions and wherein the rotation of the inner rotor and the outer rotor pushes oil that is disposed between them.

7. The continuous variable transmission as claimed in claim 1, wherein said input shaft is rotated by a power source.

8. The continuous variable transmission as claimed in claim 1, wherein said sun gear is provided with a bore that is in connection with said input shaft.

9. The continuous variable transmission as claimed in claim 1, wherein said at least one control valve is operated by means selected from a group of mechanical, electrical, hydraulic, or pneumatic mechanism.

10. The continuous variable transmission as claimed in claim 1, wherein when said at least one control valve is fully closed and oil is not flowing in said canal, said sun gear, said planet gear, said ring gear and said oil pump are fixed together as a unit with said planet carrier causing the continuous variable transmission to rotate together so as to establish a transmission gear ratio of 1 to 1.

11. The continuous variable transmission as claimed in claim 1, wherein the continuous variable transmission is associated with a roller clutch.

12. The continuous variable transmission as claimed in claim 1, further associated with a slider provided with a movable wedge roller capable of associating with said planet carrier and stopping said planet carrier from rotation.

13. The continuous variable transmission as claimed in claim 12, wherein said wedge roller stops said planet carrier by friction.

14. The continuous variable transmission as claimed in claim 12, wherein said slider is a disc mounted onto a fixed axle wherein said disc is capable of moving in a limited angular movement between a first position and a second position onto said fixed axle and wherein in the first position said wedge roller is loose and in the second position said wedge roller is pressing a gear that associates with an external ring gearwheel and force said planet carrier to stop its rotation backward.

15. The continuous variable transmission as claimed in claim 14, wherein said axle is provided with a key projection and said disc is provided with a corresponding keyway that is limited within said key projection to allow said first position and said second position.

16. The continuous variable transmission as claimed in claim 15 wherein said wedge roller is provided within a recess between a gearwheel that is associated with said planet carrier and said fixed axle.

17. The continuous variable transmission as claimed in claim 1, further connected to a hybrid engine that is capable of being charged through an external gearwheel that is connected onto the planet carrier.

18. The continuous variable transmission as claimed in claim 1, further connected through gearing and clutch mechanism to an additional oil canal provided in a stationary stand and controlled by an additional control valve.

19. The continuous variable transmission as claimed in claim 18, wherein said additional control valve is operable independently and parallel to said at least one control valve.

20. The continuous variable transmission as claimed in claim 1, further provided with a stationary external canal that is split from said canal.

21. The continuous variable transmission as claimed in claim 20, wherein said external canal is provided with a valve.

22. The continuous variable transmission as claimed in claim 20, wherein said external canal is provided with a reservoir.

23. The continuous variable transmission as claimed in claim 22, wherein said external canal is provided with a radiator that can be associated with the reservoir.

24. The continuous variable transmission as claimed in claim 1, further comprising a lockup device capable of locking said at least one oil pump that is engaged with said at least one planet gear.

25. The continuous variable transmission as claimed in claim 23, wherein said lockup device is activated in an on/off manner using a solenoid.

\* \* \* \* \*